Nov. 10, 1953  W. E. SULLIVAN  2,658,322
ADJUSTABLE LAWN MOWER HANDLE BRACKET CONSTRUCTION
Filed April 12, 1952  2 Sheets-Sheet 1

INVENTOR
WILLIAM E. SULLIVAN
BY Chapin + Neal
ATTORNEYS

Nov. 10, 1953   W. E. SULLIVAN   2,658,322
ADJUSTABLE LAWN MOWER HANDLE BRACKET CONSTRUCTION
Filed April 12, 1952   2 Sheets-Sheet 2

INVENTOR
WILLIAM E. SULLIVAN
BY Chapin + Neal
ATTORNEYS

Patented Nov. 10, 1953

2,658,322

UNITED STATES PATENT OFFICE 2,658,322

ADJUSTABLE LAWN MOWER HANDLE BRACKET CONSTRUCTION

William E. Sullivan, Springfield, Mass., assignor to Savage Arms Corporation, Utica, N. Y., a corporation of Delaware Application April 12, 1952, Serial No. 282,051

2 Claims. (Cl. 56—249)

1

This invention relates to a bracket for adjusting the angular elevation of a lawn mower handle and has for a particular object to provide for such adjustment in a power lawn mower of the type having as a feature of operation provision for manipulating the handle to tilt the frame rearwardly on the ground engaging roller or forwardly on the mower wheels.

Another object of the invention is to provide an adjusting bracket pivoted directly on the mower frame to which the lower tip end portions of the usual handle braces may be fixed.

Another object is to provide this type of adjustment in a power mower, the turning or steering of which may be suitably controlled in large part by pivoting the frame forwardly and rearwardly through use of the handle as a lever.

A further object of the invention is to provide a simplified bracket construction which may be utilized to maintain a suitable angle of elevation for the handle whenever adjustment is made in the cutting height of the mower.

These and other objects and advantages of the novel bracket will be apparent from the following description taken in conjunction with the accompanying drawings in which.

Figure 1:
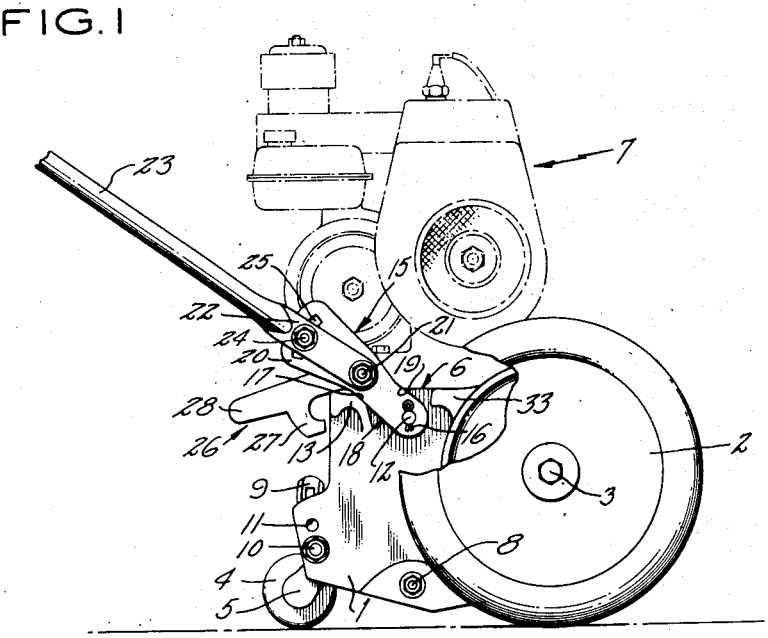
Fig. 1 is an end view of a mower with a portion of the wheel cut away showing a side frame structure with the new handle bracket attached thereto.
Figure 2:
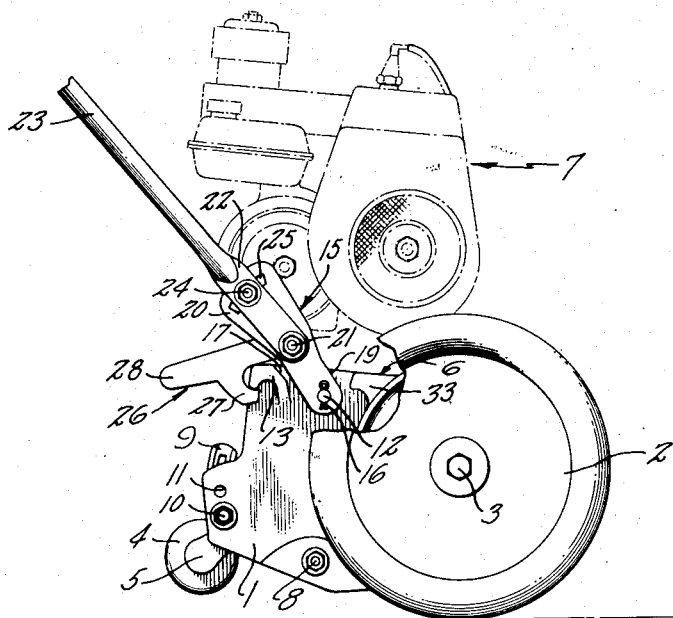
Fig. 2 is a similar view showing the mower frame forwardly tilted on the wheels as by leverage applied in raising the mower handle.
Figure 3:
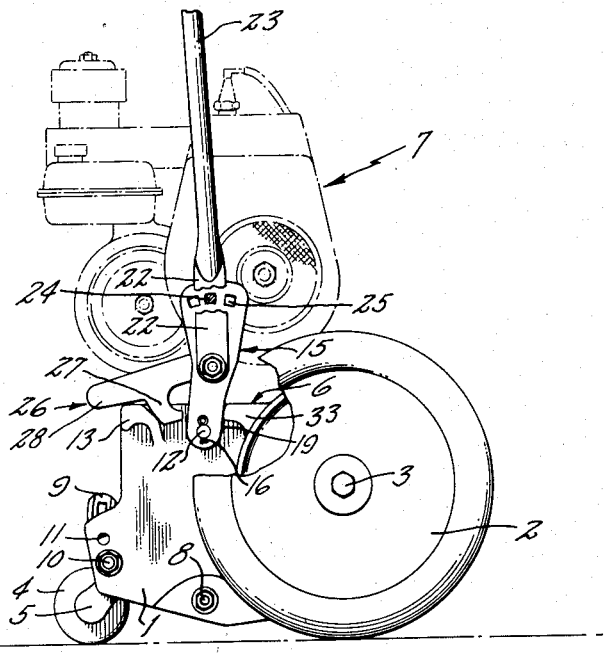
Fig. 3 is a similar view illustrating a parking position of the bracket and handle.

As in Figs. 1–3 a rotary reel type of mower is shown with a substantially rectangular side frame casting or plate 1 having a wheel 2 mounted with its axis at 3 at the forward edge of the plate. A ground engaging roller 4 is journaled on a bracket 5 fixed at the lower rear corner of the plate and frame plate 1 is rigidly connected to a side frame casting or plate of similar formation at the opposite end of the mower. Mounted between the frames is a deck at 6 on which is carried a motor and drive structure 7.

As is well understood in the art the ground roller 4 may be raised or lowered in its relation to the side frame 1 to lower or raise a bed knife fixed between the side frames as at 8. The height of the bed knife of course determines the height of cut made by the mower. A vertically extending slotted arm 9 of roller bracket 5 is fitted against the inner side of frame plate 1 at its rear corner and is fastened by a bolt 10 to be removably secured in one of a pair of vertically spaced openings 11 for the selective positioning of the roller. The side frames are swung on the axis of the wheels to raise or lower the frames as the roller adjustment is altered to adjust the height of cut.

Rearwardly with respect to the wheel in the upper section of the side frame 1 is a handle pin 12 extending laterally therefrom in axial alignment with a similar pin on an opposite side frame, the pins being adapted to receive the usual bearing openings at the ends of forked handle braces of a handle structure. At the upper rear corner of the plate is a lug 13 also projecting laterally to the same side of the plate and adapted for support of a handle brace for an upwardly and rearwardly disposed operative position for manipulating the mower.

In the usual handle construction of the prior art having no provision for adjustment, the free ends of a pair of handle braces are pivoted on the handle pin connections as 12, and the angle of elevation is determined by the rearwardly directed handle with the braces resting on the lugs 13. Where the roller brackets are adjusted to permit a low mower cutting height the rear end edges of the side frames are lowered with respect to the roller, and the handle thus has a correspondingly lower angle of elevation. When said rear frame edges are raised by the roller bracket and affixed in raised position for a higher cut the handle has a correspondingly higher angle of elevation. Inasmuch as the cutting height of the bed knife, fixed as at 8, may be varied from approximately ¾ of an inch to 2¼ inches above the ground level, it will be seen that the rear edge of a frame must be swung a proportionately greater distance in order to effect this range of cutting adjustment. And to a corresponding degree the angle of elevation of the handle is affected when the cutting height is adjusted. The result has been to place the handle pin connection and lug support in a position which is at best a compromise, as will be seen, even for the person of average height.

Most commonly an operator in guiding the mower under power prefers to grasp the handle so that the braces are raised slightly above the lugs 13. The pins and lugs are positioned so as to enable a person of average height to do this easily. In such position the user may guide the advancing mower as with a "floating" handle and the shocks and vibration of the frame incident to its movement over a ground surface are not translated to the handle in the same degree as would be the result if the handle were braced against the lug 13. It will also be seen that in an extreme forwardly tilted or "high cut" position of the frames the user may be obliged to raise his arms into an uncomfortably high position so as to free the handle braces from the lugs and eliminate jarring from the frame. In many prior structures a bracing lug is omitted entirely or in the alternative is placed low enough to cause no interference with a "high cut" position.

The mower, as shown in the attached drawings, however, also utilizes the lug 13 for a desirable and highly convenient feature of operation in that the frame may thereby be rocked rearwardly and supported entirely on the ground roller 4 with the front wheels lifted free of the ground. In this condition the forward motion of the mower wheels may be interrupted without disengaging the driving connection between the motor and wheels. The operator simply depresses the handle downwardly against the frame lugs and may then either turn the mower sharply on the roller or back it away from a tree or other object against which he wishes the grass closely trimmed. The mower may again be propelled forwardly by releasing the downward pressure and re-engaging the wheels with the ground surface. The stopping and starting is done without the awkward manipulation of successively declutching and clutching the power drive.

It is also a desirable feature of operation to enable the operator to exert an upward lifting pressure applying leverage to tilt the frame forwardly on the driving wheels by a hook engagement against the rear edge of lug 13. This feature is of advantage, for example, in guiding the mower up an incline so as to obtain better wheel traction by throwing the weight of the mower frame more directly over the wheels. It is also useful in lifting the roller and bed knife to clear an obstruction such as a stick or rock in the path of the mower which might otherwise damage the cutter blades and bed knife.

It will be appreciated from the above description of mower operation that the hand holds or grips at the outer end of a handle will be swung in a relatively wide arc while manipulating the same for all purposes. And it will also be seen that where the angle of elevation of the handle against lugs 13 is in fixed relation that persons of different height will find it awkward in one respect or another to manipulate the handle in all its described operations. For example, where the mower frames are mounted for an extremely low cut with the rear edges of the frames in lowered position, a taller than average person finds it awkward to depress the handle for the turning and backing operations with the frame tilted on the roller since the level of the hand grips may then be somewhere near knee level. Thus the tall person finds he is required to stoop in the event he wishes to pull or drag the mower rearwardly or turn a corner with the traction wheels raised above the ground. Conversely, the short person in guiding the mower adjusted for a high cut with the rear frame edges raised, finds the hand grips must be swung to an uncomfortably high position in maneuvering the handle to engage the hook on the lug and elevate the bed knife and roller to clear an obstruction.

The new bracket of this invention is designed not only to accommodate the mower for its most convenient use by a short or tall person or one of average height, but also to adjust the handle whenever the height of cut is adjusted.

As in Fig. 1, the bracket comprises a plate 15 with the inner end section thereof pivotally mounted on the handle pin connection at 12, being held thereon by a cotter pin 16. The inner section of the plate (Fig. 1) is supported for a rearwardly inclined position with the lower edge at 18 resting against a forwardly beveled corner 17 of lug 13, said lower edge being parallel to the opposite upper edge at 19. The outer section 20 of the plate is formed with the edges thereof divergently directed from the edges of the inner section to form a sector-like piece. The angular divergence of the outer edges commences approximately at the level of the deck in this position so that the upper sector section is slightly offset forwardly as will be explained.

Plate 15 is provided with longitudinally spaced openings, an inner opening being centrally of the plate 15 and receiving a bolt and nut fastening as at 21. The bolt at 21 is also threaded through an opening in the outer end of a flattened section 22 of handle brace 23. Spaced from the bolt connection at 21 is a bolt connection at 24 fastening the outer end of plate 15 and inner end of section 22. The bolt of this connection is held in an opening of section 22 and in one of a series of radially spaced openings 25 in the outer section 20. It will be apparent that the angle of elevation of the handle brace may be varied by pivoting the tip end of the brace on the bolt at 21 and fastening the connection at 24 in any one of the openings 25 without changing the moments of force in applying leverage on the side frames through pin 12 and lug 13.

On the bolt at 21 at the other side of plate 15 is pivoted a depending hook plate member 26 having a forwardly facing hook 27 adapted for engagement against the rear edge of lug 13 when the handle is raised as in the position of Fig. 2. In the position of Fig. 1 the hook 27 is spaced from the rear edge and accordingly the handle may be raised free of the lug 13 for the "floating" action of the handle in the hands of the user. It will also be noted the handle pin 12, wheel axis 3 and lug 13 are substantially in alignment and since the lug is substantially in a vertical position over the roller 4 leverage by depression of the handle (in the position of Fig. 1) may be applied to easily lift the front wheels 2 off the ground. By swinging the handle to the position of Fig. 2 the handle can be used to lift the roller off the ground.

Figure 4:
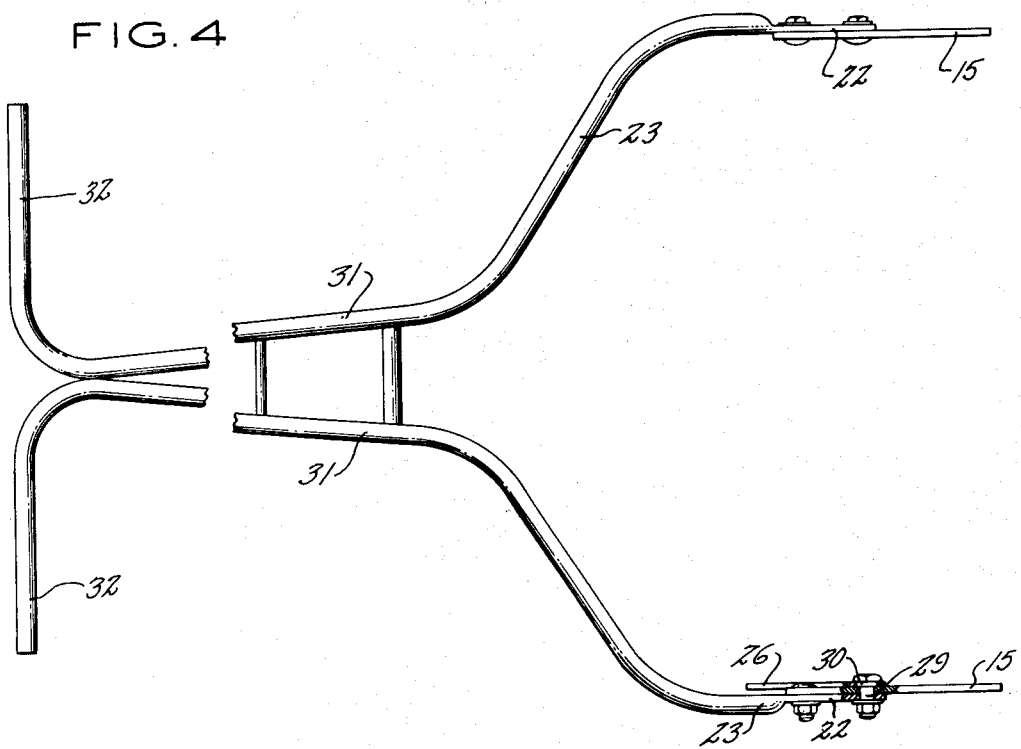
Fig. 4 is a plan view of the handle with parts cut away to show details of the bracket and lifting hook connection.

Hook 26 is provided with a heel portion 28 which may be used to kick the hook upwardly and free of the lug 13 so as to enable the vertical positioning of the handle as illustrated by Fig. 3. The hook 26 is pivoted on the bolt at 21 as shown in Fig. 4 (with the shank 29 of the bolt passing through the registered openings of plate 15 and end section 22), the hook being journaled on an enlarged spacer shoulder 30 for a free swinging action. The handle tongue members 31 and hand grips 32 complete the handle assembly. It will be realized that the upper brace 23 in this view may also be supplied with a hook plate along with the bracket 15, if desired.

In Fig. 3 a parking lug 33 is shown on the frame 1 forwardly and upwardly of pin 12 and against which the upper edge 19 of the bracket 15 is designed to rest for vertical disposition of the handle. It will also be seen that the offset outer section 20 of the bracket is angled forwardly of the abutment edge of lug 33. This will insure a vertical disposition of the handle over the mower frame in parking position even when the bolt connection 24 is secured to end section 22 in the lower opening 25 (at the left as in Fig. 3). In the parking position the handle is held against falling rearwardly by the rear edge of hook 27 bearing against the forward edge of lug 13. The handle may be lowered by the operator kicking the heel 28 upwardly to swing the hook back over the lug in lowering the handle.

What is claimed is:

1. In lawn mower construction, in combination, a side frame, a plate member pivotally fixed at its lower end on said side frame, stop members spaced forwardly and rearwardly above said pivotal connection of said plate member and limiting the pivotal swinging movement thereof from a rearwardly inclined position against the rear stop member to an upright position against the forward stop, a hook pivoted to said plate member centrally thereof and extendable rearwardly over said rear stop member, said hook being engageable with said rear stop and confining the pivotal swinging movement of said plate within limits less than the limits between said stop members, a handle brace pivotally mounted at its tip end centrally of said plate and being connected to said plate inwardly of said tip end of the brace, adjustable means for varying the angular relation of the plate and brace within a limited pivotal swinging path of said brace and means to anchor said brace and plate within the limits of said path for swinging said plate between said stop members.

2. In a power lawn mower, in combination, a side frame and on said frame a handle pin projecting therefrom, stop lugs spaced forwardly and rearwardly above said pin, a handle plate member mounted at its lower end on said pin and pivotally movable between a rearwardly inclined position against the rear lug and an upright position against the forward lug, a pivot pin on said plate centrally thereof and a hook member carried by said pin and extendable rearwardly above said rear lug with a forwardly facing hook engageable against said lug to confine the pivotal movement of the plate forwardly thereof within limits less than the limits between said lugs, said hook member being movable on said pin to pass above said rear lug forwardly of the same with said plate, a handle brace pivotally mounted at its tip end on said pivot pin of the plate and being connected to said plate inwardly of said tip end of the brace, adjustable means for varying the angular relation of the plate and brace within a limited pivotal path of said brace, and means to anchor said brace to the plate within the limits of said path for swinging said plate on said pivot pin between said lugs.

WILLIAM E. SULLIVAN.

References Cited in the file of this patent
UNITED STATES PATENTS

| Number | Name | Date |
|---|---|---|
| 392,282 | Moyer | Nov. 6, 1888 |
| 1,486,758 | Jerram | Mar. 11, 1924 |
| 1,969,211 | Dohm | Aug. 7, 1934 |